United States Patent
Siggia et al.

(10) Patent No.: US 12,377,619 B2
(45) Date of Patent: Aug. 5, 2025

(54) EDGE DESIGN OF A FLAT STIFFENING STRUCTURE FOR A COMPONENT

(71) Applicant: KAUTEX TEXTRON GmbH & Co. KG, Bonn (DE)

(72) Inventors: Fabian Siggia, Cologne (DE); Markus Hutzen, Sankt Augustin (DE)

(73) Assignee: KAUTEX TEXTRON GmbH & Co. KG, Bonn (DE)

(*) Notice: Subject to any disclaimer, the term of this patent is extended or adjusted under 35 U.S.C. 154(b) by 315 days.

(21) Appl. No.: 17/778,720

(22) PCT Filed: Nov. 18, 2020

(86) PCT No.: PCT/EP2020/082571
§ 371 (c)(1),
(2) Date: May 20, 2022

(87) PCT Pub. No.: WO2021/099409
PCT Pub. Date: May 27, 2021

(65) Prior Publication Data
US 2023/0012965 A1    Jan. 19, 2023

(30) Foreign Application Priority Data

Nov. 22, 2019   (DE) .......................... 102019131625.1

(51) Int. Cl.
*B29C 70/68*  (2006.01)
*B29C 70/76*  (2006.01)
*B29L 31/30*  (2006.01)

(52) U.S. Cl.
CPC .......... *B29C 70/682* (2013.01); *B29C 70/763* (2013.01); *B29L 2031/30* (2013.01)

(58) Field of Classification Search
CPC .. B29C 70/682; B29C 70/763; B29L 2031/30
See application file for complete search history.

(56) References Cited

U.S. PATENT DOCUMENTS 6,676,257 B2 *  1/2004  Sheldon ................. B63C 11/12
                                                       351/49
6,899,427 B1 *  5/2005  Sheldon ............. B29C 37/0085
                                                       351/86
(Continued)

FOREIGN PATENT DOCUMENTS

DE          19900178         7/2000
DE          102011056759     7/2012
(Continued)

OTHER PUBLICATIONS

Krug et al, "Transparent fiber glass reinforced composites", Jan. 9, 2013, Composites Science and Technology, entire article. (Year: 2013).*

(Continued)

*Primary Examiner* — Travis M Figg
(74) *Attorney, Agent, or Firm* — Lee & Hayes, P.C.

(57) ABSTRACT

A component having a flat reinforcing element of a first stiffness and a flat material of a second stiffness. The first stiffness is higher than the second stiffness. The flat reinforcing element has a first end on a first narrow side. The flat material, on a second narrow side thereof, has a second end that bifurcates into two strips. The two strips of the second end enclose the first end on both sides in a zone of enclosure.

14 Claims, 2 Drawing Sheets

(56) References Cited

U.S. PATENT DOCUMENTS

| | | | | |
|---|---|---|---|---|
| 2005/0048266 | A1* | 3/2005 | Reif | B29C 70/86 |
| | | | | 428/192 |
| 2006/0181089 | A1* | 8/2006 | Andre | B29C 70/76 |
| | | | | 293/120 |
| 2006/0238355 | A1* | 10/2006 | Kokuryo | B29C 45/14434 |
| | | | | 340/572.8 |
| 2009/0053457 | A1* | 2/2009 | Zou | B29C 45/14336 |
| | | | | 428/67 |
| 2018/0162029 | A1* | 6/2018 | Shiga | B29C 45/1671 |

FOREIGN PATENT DOCUMENTS

| | | |
|---|---|---|
| DE | 102011116605 | 4/2013 |
| EP | 1048442 | 11/2000 |
| EP | 2788247 | 10/2014 |
| FR | 2788334 | 7/2000 |
| JP | H0872094 | 3/1996 |
| JP | 2007533545 | 11/2007 |
| WO | WO2013083218 | 6/2013 |
| WO | WO2018189635 | 10/2018 |

OTHER PUBLICATIONS

DE Office Action from corresponding DE Patent Application No. 10 2019 131 625.1 dated Jun. 30, 2022, 3 pages.

PCT Search Report for corresponding PCT Application No. PCT/EP2020/082571 dated Feb. 22, 2021, 18 pages.

PCT International Preliminary Report on Patentability for corresponding PCT Application No. PCT/EP2020/082571 dated Jun. 2, 2022, 9 pages.

Chinese Office Action from corresponding Chinese Patent Application No. 202080080733.4 dated Mar. 31, 2023, 8 pages.

Japanese Office Action for corresponding Japanese Patent Application No. 2022-529678 dated Jun. 26, 1 2023, 15 pages.

* cited by examiner

EDGE DESIGN OF A FLAT STIFFENING STRUCTURE FOR A COMPONENT

BACKGROUND

This Application claims priority to PCT Application No. PCT/EP2020/082571, filed Nov. 18, 2020, which claims priority to DE Patent Application No. 10 2019 131 625.1, filed Nov. 22, 2019, the contents of each of which is incorporated herein by reference.

Fiber-reinforced composite materials are increasingly being used in the automotive sector to reduce component weight and increase component performance. One approach for highly stressed components manufactured using the injection molding process is the single-stage forming and in-mold forming of thermoplastic, continuous fiber-reinforced semi-finished products ("organosheets"). A corresponding procedure is also possible in the extrusion molding process. These technologies combine the outstanding mechanical properties of continuous fiber-reinforced plastics (FRP) with high cost-effectiveness and the possibility of functionalization in the injection molding process or extrusion molding process. Existing product applications include front-end module carriers, seat structures, door systems, vehicle underbody structures or underrun protection, but also fuel tank and battery housing systems.

Corresponding components have regions made of fiber-reinforced composite material and regions made of (injection molding/extrusion molding) material, which are each connected in transition regions. It is characteristic of such components that the stiffness of the injection molding/extrusion molding component is significantly lower than the stiffness of the fiber-reinforced composite component. Due to the jump in stiffness, the transition between the two zones represents a concentration of stress and thus a weak point under mechanical stress, in particular impact or crash loads.

Injection molding/extrusion molding material and FRP semi-finished products are usually connected by overmolding or forming the edge regions of the semi-finished product. Full-surface overmolding/forming is generally not advisable from the point of view of lightweight construction. Existing design guidelines for these transition regions as well as for force introduction and functional elements describe a combination of end-face gating/molding and gating/molding that overlaps on one side. The focus here is primarily on the visual and haptic properties of the component (trimming) and less on the mechanical properties. The disadvantage here is that the known constructions are not suitable for high mechanical bond strength and energy absorption under high loads. The invention is based on the object of providing constructions that are suitable for high mechanical bond strength and energy absorption under high loads and/or are visually appealing.

In order to achieve this object, a component and a method for manufacturing said component, as defined in the appended claims, are provided.

DETAILED DESCRIPTION

The invention relates to a component having a flat reinforcing element of a first stiffness and a flat material of a second stiffness, the first stiffness being higher than the second stiffness. The reinforcing element has a first end on a first narrow side and the material on a second narrow side has a second end that bifurcates into two strips, and the two strips of the second end enclose the first end on both sides in a zone of enclosure.

Due to the two-sided enclosing of the flat reinforcing element by the flat material, the component offers the advantage that the stability of the composite of flat reinforcing element and material is maintained even when strong forces act on the composite. In particular, the component can better withstand forces acting vertically with respect to the surface of the component. Such a component, which encloses the flat reinforcing element on both sides, is mechanically equally stable regardless of side or direction for a vertically acting force (for example, from the inside or outside or with overpressure and underpressure on opposite sides of the component) and is therefore stable depending on the direction of force.

For the purposes of the invention, "flat" means that the object extends over a surface and the vertical extent thereof is very small compared to its horizontal extent. Flat objects have one or more narrow sides at the end of their horizontal extension, which narrow sides are bordered by the horizontally extending upper sides and undersides. In the present invention, the narrow side of the flat material is formed by two strips that extend parallel to each other along the length of the narrow side of the flat material. Thus, the two strips can receive the end of the flat reinforcing element between them (e.g. without gaps, in a form-fitting manner and/or integrally). The upper sides and undersides of the flat reinforcing element and the flat material run in one plane or in a plurality of planes that are parallel to one another over the entire extension or part of the extension of the planes. The flat reinforcing element and the flat material can contain portions in which the upper sides and undersides are curved.

In a horizontal arrangement, the component comprises a) a region of the flat reinforcing element, b) a zone of enclosure, and c) a base material zone of the flat material, in that order.

For the purposes of the invention, a zone of enclosure consists in a horizontal arrangement of i) a zone of overlap, i.e., the zone in which the strips overlap with the flat reinforcing element in the surface, and ii) a ramp zone that borders on the zone of overlap and in which no overlap takes place. In the ramp zone, the flat material can have a wall thickness that is greater than the wall thickness of the flat material in the base material zone. The ramp zone is arranged between the zone of overlap and the base region.

The wall thickness of a strip of the flat material is understood to be the wall thickness of the material in the zone of overlap. The wall thickness of the material outside the zone of overlap is simply the wall thickness of the flat material in said zone.

The two strips of the flat material can have a structure that is asymmetrical or symmetrical to one another, an imaginary plane through the horizontal center of the flat reinforcing element forming the mirror plane. The structure is preferably symmetrical. The end faces of both the first and the second strip can be at the same distance from a narrow side of the flat reinforcing element. This means that the end faces of the strips are arranged precisely one above the other, or are offset from one another by only a small degree of 20%-0% or 10%-0%.

For the purposes of the invention, "stiffness" is the extensional stiffness, shear stiffness, flexural stiffness and/or torsional stiffness. The fact that the first stiffness is higher than the second stiffness means that the extensional stiffness, shear stiffness, flexural stiffness and/or torsional stiffness of the flat reinforcing element is higher than the corresponding extensional stiffness, shear stiffness, flexural stiffness and/or torsional stiffness of the flat material. The first stiffness, expressed in particular as the extensional stiffness (the modulus of elasticity), can be at least 2 times, 2 to 250 times, 3 to 200 times, or 20 to 100 times the second stiffness, expressed in particular as extensional stiffness (modulus of elasticity).

The flat material can run in an arc over the entire zone of enclosure (in a cross section, i.e., transverse to the extension of the surface of the material).

The resulting achieved advantage is that the material in the zone of overlap, in which the strongest forces occur under load, is particularly thick. Furthermore, the arc-like progression allows the wall thickness of the material to increase slowly from the starting point of the arc on the side towards the base region of the material to the end point of the arc, which borders the flat reinforcing element, at first up to a maximum value and then to continuously decrease again. In this way, sharply offset transitions between the flat reinforcing element and the flat material are avoided, and the component is given additional stability, which prevents the component from detaching under load.

For the purposes of the invention, "arc-like" can denote a continuously steady increase/decrease in the wall thickness of the material in the transition region, i.e., an actual arc shape. However, "arc-like" can mean that there is a shape that consists of a plurality of straight portions, the transitions between the plurality of straight portions being marked by an edge and/or being formed by an arc.

The wall thickness of the material can be at a maximum at the position at which the first end forms a narrow side of the flat reinforcing element, meaning that the surface of the material at the position at which the first end forms a narrow side of the flat reinforcing element is at the greatest distance from the opposite surface of the reinforcing element. The wall thickness of the material of a strip or of both strips at this position can be equal to or greater than half the base material thickness. In total, the wall thicknesses of the material at this position in the strips can therefore be equal to or greater than the base material thickness. The position of the wall thickness of the material at which the first end forms a narrow side of the flat reinforcing element designates a position on the surface of the material from which a solder can be dropped onto the enclosed first end of the narrow side of the flat reinforcing element, i.e., the point where the edge of the flat reinforcing element meets the second end of the flat material.

As a result, the wall thickness of the material, of the strip or of the strips, which wall thickness the material forms at this position, is highest in the transition region between the flat reinforcing element and the flat material. This position is the one where the component is most likely to break under load. The wall thickness of the material at this position therefore counteracts breakage of the component.

Furthermore, the minimum wall thickness can be equal to or greater than the base material wall thickness, i.e., the wall thickness of the material outside the zone of enclosure.

The wall thickness of the material at this position therefore counteracts breakage of the component in a particularly advantageous manner.

The base material wall thickness can be $\geq 0.8$ mm and $\leq 10$ mm; $\geq 1$ mm and $\leq 5$ mm; $\geq 1.5$ mm and $\leq 4.5$ mm; $\geq 2.0$ mm and $\leq 3.5$ mm; $\geq 2.0$ mm and $\leq 3$ mm; or $\geq 2.25$ mm and $\leq 2.75$ mm.

The ramp zone can have a length of $\geq 1.5$ mm and $\leq 15$ mm, $\geq 1.5$ mm and $\leq 5.0$ mm, $\geq 2.0$ mm and $\leq 4.5$ mm; $\geq 2.5$ mm and $\leq 4.0$ mm; or $\geq 3.00$ mm and $\leq 3.50$ mm. The length of the ramp zone is defined as the distance between the starting point of the arc (on the side towards the base region of the material) and the point at which a perpendicular is dropped from the position where the wall thickness of the material in the arc is at a maximum to the imaginary extension of the surface of the flat material in the base region.

The zone of overlap can have a length of $\geq 1.5$ mm and $\leq 15$ mm, $\geq 5.0$ mm and $\leq 15.0$ mm, $\geq 7.0$ mm and $\leq 12.0$ mm, $\geq 8.0$ mm and $\leq 11.0$ mm, or $\geq 9.00$ mm and $\leq 10.00$ mm.

The maximum wall thickness can be 0.5× to 2×, 1× to 2×, 1× to 1.75×, 1× to 1.5×, or 1× to 1.25× the base material wall thickness.

The length of the zone of overlap between the reinforcing element and the material can be 0.5 to 10×, 1.5 to 8×, 1.7 to 6× or 2 to 4× the base material wall thickness.

It has been shown that this ratio between the length of the zone of overlap and the material ensures particularly high stability of the component.

Indentations (i.e., recesses or openings) can be provided in the end face of at least one of the strips.

These indentations can be produced by hold-down devices provided in the mold or in the tool that is used to produce the component. Hold-down devices can reduce or prevent displacement or "flaring" (e.g. loosening of the bond between the fabric layers in the case of an organosheet) of the reinforcing element due to the inflowing (plastic) melt and stabilize the flat reinforcing element against the melt flow or the pressed material, such that said melt flow is ideally held in the center with respect to the wall thickness (or said melt flow is not pressed on one side toward the edge region of the wall).

The "end faces" of the strips mean the sides of the strips that face the flat reinforcing element and lie in the zone of overlap. The indentations therefore protrude from the end face of the strips at an angle of 80° to 100°, preferably 90°, into the strips.

Indentations can be provided in both strips.

This offers the advantage that, during the production process, there is largely symmetrical stabilization of the flat reinforcing element in relation to the melt flow or the material pressed on.

The indentations of the first strip can be arranged opposite to the indentations of the second strip.

The respective indentations in the two strips are thus directly one above the other.

This offers the advantage that, during the production process, the flat reinforcing element is stabilized very symmetrically in relation to the melt flow or the material pressed on.

The indentations can have two different lengths, and the indentations having two different lengths can be arranged alternately.

In particular, in one of the strips there can be a first group of indentations having one length and a second group of indentations having a second length, the first length being greater than the second length.

Said first group and said second group of indentations can be present both in the first and in the second strip.

The indentations of the second group of indentations in the first strip can be opposite the indentations of the first group in the second strip; and the indentations of the first group of indentations in the first strip can be opposite the indentations of the second group in the second strip. As a result, the length of the indentations alternates both within a strip and between the strips.

This arrangement has the advantage that the finished component is particularly impervious to the fluid when used, for example, in a fluid container. Furthermore, a visible weld line is avoided.

Alternatively, the indentations of the second group of indentations in the first strip can be opposite the indentations of the second group in the second strip; and the indentations of the first group of indentations in the first strip can be opposite the indentations of the first group in the second strip. As a result, the length of the indentations only alternates within the respective strip.

This can have the advantage of achieving an improved fluid seal, but the manufacturing process is relatively simple because of the simpler mold needed to manufacture this embodiment.

The indentations can have a length of 100% to 25% of the length of the zone of overlap. Preferably, the indentations can be provided with a length of 95% to 70% of the length of the zone of overlap, and/or indentations can be provided with a length of 25% to 50% of the length of the zone of overlap (in particular, these different lengths can be combined when two groups of indentations having different lengths are provided).

Furthermore, the indentations within one strip or within both strips can be approximately equidistant from one another (approximately meaning a deviation of up to 25% in the distance between all indentations by a mean value of the distance). In particular, the distances between the indentations in both strips can be approximately the same. However, it is also disclosed that, depending on the design specifications, the distances between the indentations within one or both strips can be freely adjusted or are variable, at least in a partial region of the respective strip (for example up to 30%).

The equidistance further improves the pressure distribution under load.

The reinforcing element can be a plastic, a fiber composite material of a thermoplastic or duroplastic type, in particular (a plate made of) fiber-reinforced plastic, a metal plate or a wooden plate.

Fiber-reinforced plastics consist of a matrix and reinforcing fibers.

The matrix can be a thermoplastic matrix (polyether ether ketone, PEEK; polyphenylene sulfide, PPS; polysulfone, PSU; polyetherimide, PEI; polytetrafluoroethene, PTFE; polyamide, e.g. PA6, PA66, PA612, or polypthalamide, PPA; polyolefin, e.g. polyethylene, PE, or polypropylene, PP; and/or polycarbonate, PC), or a duroplastic matrix (epoxy resin, EP, e.g. 2%; unsaturated polyester resin, UP, e.g. 8%; vinyl ester resin, VE; phenol-formaldehyde resin, PF, e.g. 38%; diallyl phthalate resin, DAP; methacrylate resin, MMA; polyurethane, PUR; and/or amino resins).

Reinforcing fibers can be inorganic, non-metallic reinforcing fibers (basalt fibers, boron fibers, glass fibers, ceramic fibers, silica fibers, carbon fibers, and/or quartz fibers), organic reinforcing fibers (aramid fibers, PBO fibers, polyester fibers, nylon fibers, polyethylene fibers, and/or polymethylmethacrylate fibers) and/or metallic reinforcing fibers (steel fibers).

In relation to their length, the reinforcing fibers can be short fibers (0.1 to 1 mm), long fibers (1 to 50 mm), or continuous fibers (>50 mm). The latter are preferred because of the very high stiffness they impart. The arrangement of reinforcing fibers can be woven or laid. The reinforcing fibers can also be arranged in one or more layers.

The reinforcing element can consist of a plastic that is compatible with the plastic of the flat material, such that an integral connection can result between the reinforcing element and the flat material. Furthermore, the reinforcing element can consist of a material that is compatible with the plastic of the flat material, but be coated with a plastic at least at the points where the reinforcing element comes into contact with the flat material or in its entirety, such that an integral connection can result between the reinforcing element and the flat material (in this case the stiffness of the coated reinforcing element corresponds to the stiffness of the uncoated reinforcing element). In addition, however, a form fit can also result.

Furthermore, the reinforcing element can consist of a material that is not compatible with the plastic of the flat material, such that a form-fitting connection can result between the reinforcing element and the flat material.

The (flat) material can be an injection molding material, in particular an injection molding material of a thermoplastic type. Thermoplastic injection molding material can be polyolefin (polypropylene, PP, polyethylene, PE), Plexiglas, PMMA, polycarbonate, PC, polystyrene, PS and copolymers thereof (e.g. ABS=acrylonitrile butadiene styrene), polyamide, PA or polyoxymethylene.

The material can be an extrusion molding material of a thermoplastic or thermoset type. The thermoplastic extrusion molding material can be long-fiber-reinforced thermoplastic (LFT with glass fiber or carbon fiber), direct long-fiber-reinforced thermoplastic (D-LFT), glass mat thermoplastic, GMT, or a carbon-fiber-reinforced polymer, CFRP. The thermoset extrusion molding material can be sheet molding compound (SMC with glass fiber or carbon fiber), direct sheet molding compound, D-SMC, or bulk molding compound, BMC.

The choice of material and reinforcing element depends on the desired field of application, a person skilled in the art being able to select materials and reinforcing elements according to the field of application. The only important factor is that the stiffness of the reinforcing element is higher than the stiffness of the material.

The strips of the flat material can completely enclose an edge that contains the entirety of the first narrow side of the reinforcing element. Alternatively, the flat material can also enclose said edge only in part, for example enclose only one end face of the reinforcing element, such that regions of the edge/the narrow side of the reinforcing element remain free.

Thus, the entire peripheral edge of the reinforcing element is stabilized by the flat material.

The invention also relates to a front-end module carrier, seat structure, door system, vehicle underbody structure, underrun protection, fuel tank housing, flat (structural) components for battery systems or batteries (e.g. cell module end plates) or battery housing comprising the component described above.

In particular, front-end module carriers, seat structures, door systems, vehicle underbody structures, underrun protection, fuel tank housings or battery housings can be exposed to high mechanical loads, in particular in the case of impact or crash loads. The components described here are therefore in particular suitable for designing these components.

The invention also relates to a method for producing the component described above, comprising:
  a. providing the reinforcing element in an at least two-part mold;
  b. introducing the material into the mold;
  c. forming the component by means of injection molding or extrusion in the mold;
  d. removing the component obtained.

A mold is understood here as any suitable mold or tool that can receive the flat reinforcing element and, in a closed state, provides cavities around the reinforcing element, into which cavities the material can be injected through channels (injection molding) or in which material can be provided for pressing (extrusion molding). In injection molding, the component can be removed after the material (3) has reached its solidification point. The cavities are designed in such a way that they can give the material the shape defined by the component described above.

EXAMPLE

In the description that follows, the same reference signs denote the same components or the same elements, so that a description made with reference to a figure with regard to a component also applies to the other figures so as to avoid repeating the description. Furthermore, individual features that have been described in connection with one embodiment can also be used separately in other embodiments.

Figure 1:
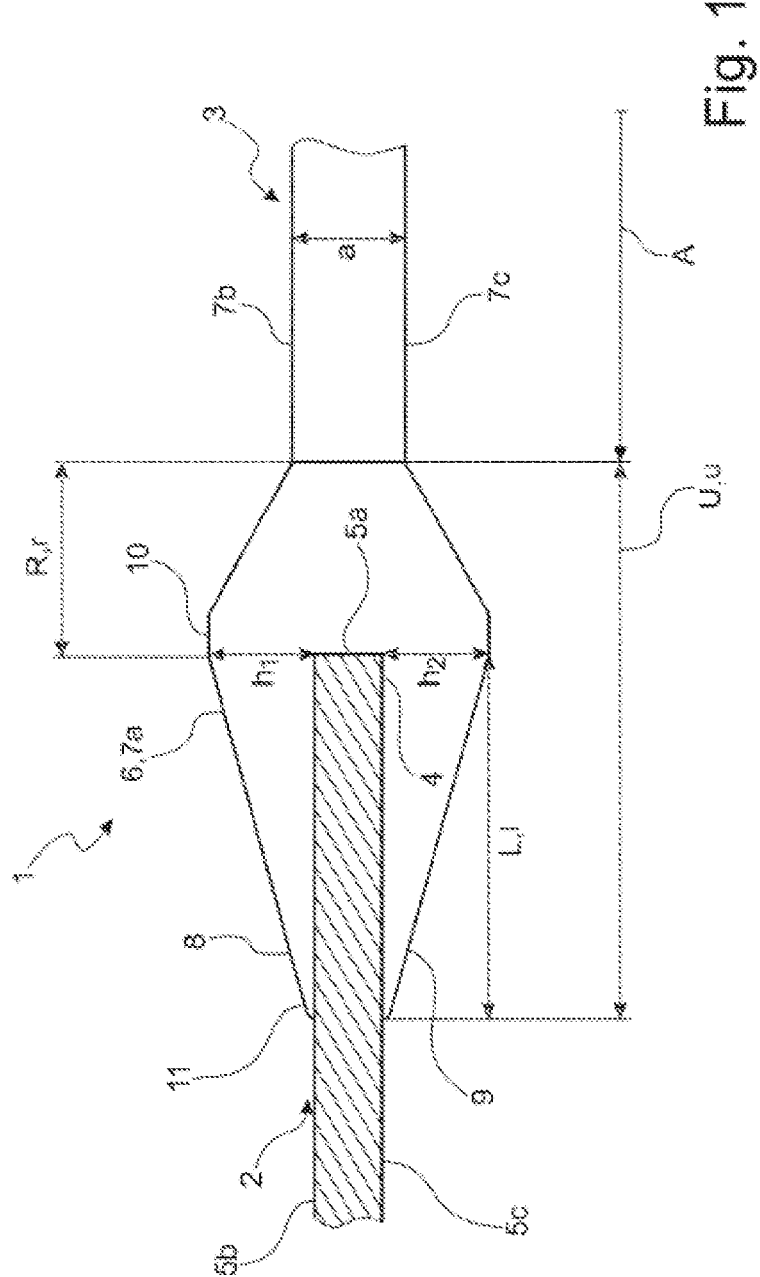
FIG. 1 illustrates the component according to the invention in a cross-sectional view.

FIG. 1 illustrates the component 1 according to the invention in a cross-sectional view.

The component 1 comprises a reinforcing element 2 that is flat and has a high level of stiffness. Fiber-reinforced composite materials of a thermoplastic or duroplastic type, but also metal plates and other plates, are suitable here.

At a first end 4 (shown on the right-hand side in FIG. 1), the reinforcing element 2 has a narrow side 5a that is delimited by an upper side 5b and an underside 5c. The opposite end of the reinforcing element is not shown in the drawing.

This reinforcing element 2 is overmolded on both sides with a less stiff (injection molding) material 3 in a zone of enclosure U having the length u. This material 3 is also largely flat. Due to the overmolding on both sides, the material 3 forms two strips 8, 9 made of the material 3 at a second end 6 (on the left side of the material 3 in FIG. 1), which strips are in contact with the reinforcing element 2 in a zone of overlap L (directly, i.e., without the formation of cavities). The opposite end of the material 3 is not shown in the drawing. A representation of the material 3 having the two strips 8, 9 without the reinforcing element 2 can be found in FIG. 3. It can be seen in FIGS. 2 and 3 that the two strips are located one above the other on the narrow side of the material 3 and project approximately equally over the reinforcing element 2.

The zone of enclosure U comprises the zone in which the material 3 initially thickens in a ramp zone R in relation to a base material zone A and starting from said base material zone, but does not yet overlap with the reinforcing plate, and a zone of overlap L in which the material 3 overlaps with the reinforcing plate.

The flat material 3 can run in an arc over the entire zone of enclosure U (in a cross section, i.e., transverse to the extension of the surface of the material 3), as shown in FIG. 1.

For the purposes of the invention, "arc-like" can denote a continuously steady increase/decrease in the wall thickness of the material 3 in the zone of enclosure U, i.e., an actual arc shape. However, "arc-like" can mean that there is a shape that consists of a plurality of straight portions, the transitions between the plurality of straight portions being angular and/or being formed by an arc, as shown in FIG. 1.

In particular, the maximum wall thickness $h_1$, $h_2$ of the material 3 or of the strips 8, 9 can be in the region above the interface between the reinforcing element 2 and the material 3. The wall thickness $h_1$, $h_2$ of the material 3 can therefore be at its maximum at the position at which the first end 4 forms a narrow side 5a of the flat reinforcing element 2. At this position, where the first end 4 forms a narrow side 5a of the flat reinforcing element 2, the surface (upper side 7b or underside 7c) of the material 3 is at the greatest distance from the opposite surface (upper side 5b or underside 5c) of the reinforcing element 2.

As a result, the wall thickness $h_1$, $h_2$ of the material 3, of the strip 8, 9 or of the strips 8, 9, which wall thickness the material 3 forms at this position, is highest in the transition region between the flat reinforcing element 2 and the flat material 3 ("maximum wall thickness"). This position is the one where the component 1 is most likely to break under load. The wall thickness of the material 3 at this position therefore counteracts breakage of the component 1 in a particularly effective manner.

Furthermore, said maximum wall thickness $h_1$, $h_2$ is equal to or greater than the base material wall thickness ½ a, i.e., the wall thickness of the material 3 outside the zone of enclosure U.

The wall thickness $h_1$, $h_2$ of the material 3 at this position therefore counteracts breakage of the component 1 in a particularly advantageous manner. This also ensures that, in the transition region, i.e., the region where the narrow side 5a of the reinforcing element meets the flat material 3, the wall thickness also corresponds at least to the wall thickness ½ a in the base material zone A, and the strength in this region therefore corresponds approximately to the strength that can be found in the rest of the component 1.

The length of the zone of overlap L is, for example, 2 to 4 times the base material wall thickness a.

It has been shown that this ratio between the length of the zone of overlap L and the material 3 ensures particularly high stability of the component 1, while at the same time preventing overuse of the material 3.

Figure 2:
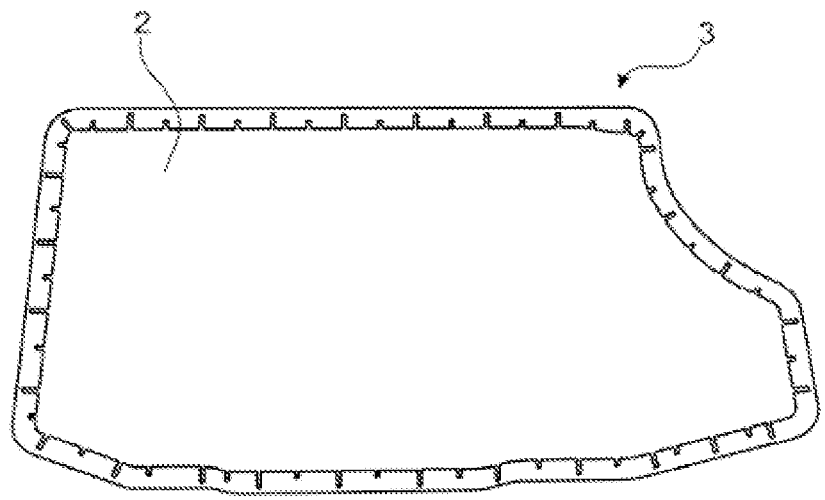
FIG. 2 illustrates the component according to the invention in a plan view.
Figure 3:
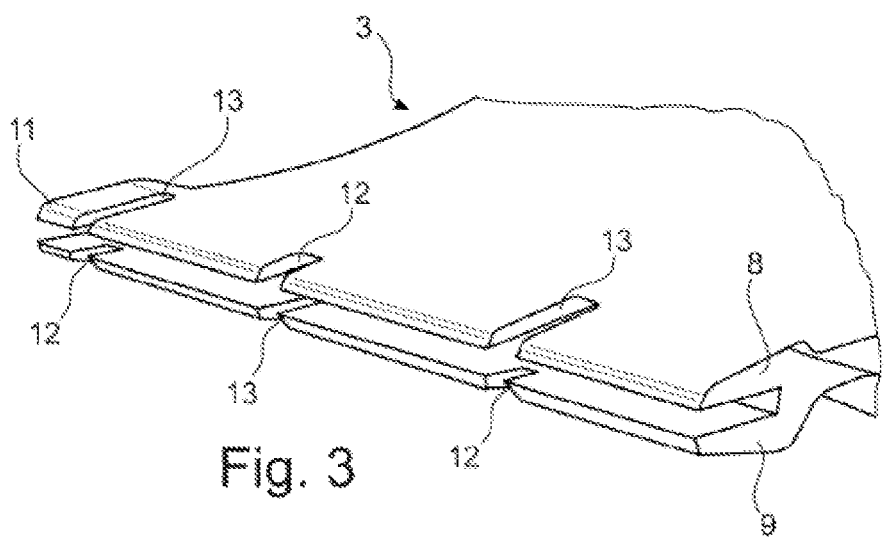
FIG. 3 illustrates the flat material of the component according to the invention in a perspective view in which indentations are visible.

FIG. 2 illustrates the component 1 according to the invention in a plan view and FIG. 3 shows a perspective detailed view of the material 3 from FIG. 2.

As shown in FIGS. 2 and 3, indentations 12, 13 (i.e., cutouts, recesses) can be provided on the end face 11 of the strips 8, 9 from the zone of overlap.

These indentations 12, 13 can be produced by hold-down devices provided in the mold or in the tool that is used to produce the component 1. Hold-down devices can reduce or avoid displacement or "flaring" (e.g. loosening of the bond between the fabric layers in the case of an organosheet) of the reinforcing element 2 due to the inflowing (plastic) melt and the pressed-on material and stabilize the flat reinforcing element 2 against the melt flow, such that said melt flow is ideally held in the center with respect to the wall thickness of the material (or said melt flow is not pressed on one side toward the edge region of the wall).

In FIG. 3, indentations 12, 13 are provided in both strips 8, 9.

This offers the advantage that, during the production process, there is a largely symmetrical stabilization of the flat reinforcing element 2 in relation to the melt flow.

As shown by way of example in FIG. 3, the indentations 12, 13 of the first strip 8 can be arranged opposite the indentations of the second strip 9.

The respective indentations 12, 13 in the two strips 8, 9 are thus directly one above the other.

This offers the advantage that, during the production process, the flat reinforcing element 2 is stabilized very symmetrically in relation to the melt flow or the material pressed on.

As shown in FIGS. 2 and 3, the indentations 12, 13 can have two different lengths, and the indentations 12, 13 having two different lengths can be arranged alternately. In this case, an indentation 13 having a long length in the upper strip 8, as in the case of the indentations that are arranged on the left and right in FIG. 3, can face an indentation 12 having a short length in the strip 9 located underneath. Correspondingly, an indentation 12 having a short length in the upper strip 8, as in the case of the indentation 12 that is arranged in the center in FIG. 3, can face an indentation 13 having a long length in the strip 9 located underneath.

This arrangement has the advantage that the finished component 1 is particularly impervious to the fluid when used, for example, in a fluid container. Furthermore, a visible weld line is avoided.

As shown in FIG. 2, the material 3 can completely enclose the narrow side 5a of a flat reinforcing element 2. However, it is also conceivable that the material 3 is only attached to one or more partial regions of the flat reinforcing element 2.

LIST OF REFERENCE SIGNS

1: component
2: (flat) reinforcing element
3: (flat) material
4: first end of the flat reinforcing element
5a: narrow side of the flat reinforcing element
5b: upper side of the flat reinforcing element
5c: underside of the flat reinforcing element
6: second end of the flat material
7a: narrow side of the flat material
7b: upper side of the flat material
7c: underside of the flat material
8: first strip
9: second strip
10: position of the maximum wall thickness of the material
11: end face of the zone of overlap
12: indentation, short
13: indentation, long
U, u: zone of enclosure, length of the zone of enclosure
R, r: ramp zone
A, a: base material zone, base material thickness
L, l: zone of overlap, length of the zone of overlap
$h_1$: wall thickness of the first strip
$h_2$: wall thickness of the second strip

The invention claimed is:

1. A component comprising:
a flat reinforcing element of a first stiffness; and
a flat material of a second stiffness, the first stiffness being higher than the second stiffness, the flat reinforcing element having a first end on a first narrow side, and the flat material on a second narrow side having a second end that bifurcates into two strips, and the two strips of the second end enclosing the first end on both sides in a zone of enclosure,
wherein the flat material runs in an arc over an entirety of the zone of enclosure,
wherein a wall thickness of the flat material is at a maximum at a position at which the first narrow side of the flat reinforcing element meets the second end of the flat material,
wherein the wall thickness of the flat material increases continuously from a starting point of the arc to the position at which the first narrow side of the flat reinforcing element meets the second end of the flat material, and the wall thickness of the flat material decreases continuously from the position at which the first narrow side of the flat reinforcing element meets the second end of the flat material to an end of the arc.

2. The component according to claim 1, wherein a maximum wall thickness of the flat reinforcing element is equal to or greater than half a wall thickness of the flat material outside the zone of enclosure.

3. The component according to claim 1, wherein a length of a zone of overlap between the flat reinforcing element and the flat material is 1.5 to 8 times a wall thickness of the flat material.

4. The component according to claim 1, wherein indentations are provided in at least one of the two strips on an end face thereof.

5. The component according to claim 4, wherein the indentations are provided in both of the two strips.

6. The component according to claim 5, wherein the indentations of a first strip of the two strips are arranged offset relative to the indentations of a second strip of the two strips.

7. The component according to claim 5, wherein the indentations of a first strip of the two strips are arranged opposite the indentations of a second strip of the two strips.

8. The component according to claim 4, wherein a length of all indentations is the same.

9. The component according to claim 4, wherein in one strip of the two strips, there is a first group of indentations having a first length and a second group of indentations having a second length, and the first length is greater than the second length.

10. The component according to claim 9, wherein the one strip is a first strip and the two strips includes a second strip, and
wherein the first group of indentations and the second group of indentations are present both in the first strip and in the second strip.

11. The component according to claim 10, wherein the indentations of the second group in the first strip are opposite the indentations of the first group in the second strip, and
wherein the indentations of the first group in the first strip are opposite the indentations of the second group in the second strip.

12. The component according to claim 10, wherein the indentations of the second group in the first strip are opposite the indentations of the second group in the second strip, and
wherein the indentations of the first group of indentations in the first strip are opposite the indentations of the first group in the second strip.

13. The component according to claim 1, wherein the flat material is formed of:
an injection molded material of a thermoplastic type, or an extrusion molded material of a thermoplastic or a duroplastic type.

14. The component according to claim 1, wherein the two strips of the flat material completely enclose:
an edge of the flat reinforcing element that contains an entirety of the first narrow side of the flat reinforcing element, or only a partial region of the edge of the flat reinforcing element.

* * * * *